United States Patent
Skroski et al.

(10) Patent No.: US 12,160,011 B2
(45) Date of Patent: Dec. 3, 2024

(54) BATTERY PACK FOR A CARBON FIBER POUCH CELL CASING CONFIGURED TO COOL BATTERY CELLS

(71) Applicant: BETA AIR, LLC, South Burlington, VT (US)

(72) Inventors: Tyler John Skroski, South Burlington, VT (US); Nathan William Joseph Wiegman, Burlington, VT (US); Stuart Denson Schreiber, South Burlington, VT (US)

(73) Assignee: BETA Air LLC, South Burlington, VT (US)

( * ) Notice: Subject to any disclaimer, the term of this patent is extended or adjusted under 35 U.S.C. 154(b) by 10 days.

(21) Appl. No.: 17/839,887

(22) Filed: Jun. 14, 2022

(65) Prior Publication Data
US 2023/0402693 A1    Dec. 14, 2023

(51) Int. Cl.
| | |
|---|---|
| *H01M 50/229* | (2021.01) |
| *H01M 10/613* | (2014.01) |
| *H01M 10/653* | (2014.01) |
| *H01M 50/211* | (2021.01) |
| H01M 10/625 | (2014.01) |
| H01M 10/647 | (2014.01) |
| H01M 10/6551 | (2014.01) |
| H01M 10/6555 | (2014.01) |

(Continued)

(52) U.S. Cl.
CPC ....... *H01M 50/229* (2021.01); *H01M 10/613* (2015.04); *H01M 10/653* (2015.04); *H01M 50/211* (2021.01); H01M 10/625 (2015.04); H01M 10/647 (2015.04); H01M 10/6551 (2015.04); H01M 10/6555 (2015.04); H01M 10/6556 (2015.04); H01M 10/6567 (2015.04); H01M 2220/20 (2013.01); Y02E 60/10 (2013.01)

(58) Field of Classification Search
CPC ............ H01M 50/229; H01M 50/221; H01M 10/613; H01M 10/625; H01M 10/647; H01M 10/653; H01M 10/6551; H01M 10/6555; H01M 10/6556; H01M 10/6567; H01M 2220/20; H01M 50/211
See application file for complete search history.

(56) References Cited

U.S. PATENT DOCUMENTS

| | | |
|---|---|---|
| 8,465,864 B1 | 6/2013 | Kwak et al. |
| 10,128,549 B2 | 11/2018 | Bender et al. |
| 10,181,587 B2 | 1/2019 | Ota et al. |

(Continued)

FOREIGN PATENT DOCUMENTS

| | | |
|---|---|---|
| CN | 208368586 | 1/2019 |
| CN | 208368586 U | 1/2019 |

(Continued)

*Primary Examiner* — Lingwen R Zeng
(74) *Attorney, Agent, or Firm* — Hoffman Warnick LLC

(57) ABSTRACT

Aspects of the present disclosure are generally related to a battery pack having a carbon fiber battery case, the battery pack comprising a plurality of pouch cells. Further, the battery pack having a carbon fiber battery case may include a casing formed with carbon fiber, the casing having one or more carbon fiber separation sheets and, the casing configured to dissipate heat from the plurality of pouch cells in a direction along carbon fibers of the casing.

11 Claims, 7 Drawing Sheets

(51) Int. Cl.
*H01M 10/6556* (2014.01)
*H01M 10/6567* (2014.01)

(56) References Cited

U.S. PATENT DOCUMENTS

| | | | |
|---|---|---|---|
| 10,199,695 B2 | 2/2019 | Lobert et al. | |
| 11,165,120 B1 | 11/2021 | Wang | |
| 11,183,729 B2 | 11/2021 | He et al. | |
| 11,848,458 B1 * | 12/2023 | Lawes | H01M 10/655 |
| 2011/0204842 A1 * | 8/2011 | Nagasaki | H01M 8/2475 |
| | | | 320/101 |
| 2015/0079426 A1 * | 3/2015 | Chen | H01M 50/308 |
| | | | 429/53 |
| 2015/0118537 A1 * | 4/2015 | Obasih | H01M 50/209 |
| | | | 429/120 |
| 2015/0380697 A1 * | 12/2015 | Osborne | H01M 50/209 |
| | | | 429/153 |
| 2017/0012260 A1 * | 1/2017 | Knowles | H01M 50/227 |
| 2017/0256760 A1 | 9/2017 | Nietling et al. | |
| 2017/0338535 A1 | 11/2017 | Bhoir | |
| 2019/0280265 A1 | 9/2019 | Jansen et al. | |
| 2020/0303689 A1 * | 9/2020 | Kinno | H01M 4/134 |
| 2020/0358058 A1 | 11/2020 | Murayama et al. | |
| 2021/0143517 A1 | 5/2021 | Lepiorz et al. | |
| 2021/0151841 A1 * | 5/2021 | Johnson | H01M 50/489 |
| 2021/0175563 A1 * | 6/2021 | McGlen | B60L 50/64 |
| 2021/0320365 A1 * | 10/2021 | Nishikawa | H01M 50/24 |
| 2021/0328291 A1 * | 10/2021 | Nishikawa | H01M 10/0525 |
| 2021/0376411 A1 | 12/2021 | Yen et al. | |
| 2022/0021074 A1 * | 1/2022 | Mabrey | H01M 50/553 |
| 2022/0416344 A1 * | 12/2022 | Jeon | H01M 50/233 |

FOREIGN PATENT DOCUMENTS

| | | | | |
|---|---|---|---|---|
| CN | 111224021 A | * | 6/2020 | |
| DE | 102017219240 A1 | * | 5/2019 | |
| KR | 20150072107 | | 6/2015 | |
| KR | 20150072107 A | | 6/2015 | |
| KR | 102328646 B1 | * | 5/2019 | B32B 15/08 |
| WO | 2020232663 | | 11/2020 | |

* cited by examiner

BATTERY PACK FOR A CARBON FIBER POUCH CELL CASING CONFIGURED TO COOL BATTERY CELLS

CROSS-REFERENCE TO RELATED APPLICATIONS

This application claims priority to Provisional Application No. 63/279,444 filed on Nov. 15, 2021 and entitled "SYSTEM AND METHOD FOR A BATTERY ASSEMBLY," the entirety of which is incorporated herein by reference.

FIELD OF THE INVENTION

The present invention generally relates to the field of transportation and aircraft. In particular, the present invention is directed to a battery pack for electric vertical take-off and landing vehicle configured to cool battery cells.

BACKGROUND

Electric vertical take-off and landing vehicle (eVTOL) battery cells may suffer from thermal runaway. Thermal runaway occurs when a battery cell overheats causing conditions that contribute to further overheating of the battery cell in an uncontrolled positive feedback loop.

SUMMARY OF THE DISCLOSURE

In an aspect a battery pack having a carbon fiber battery case, the battery pack comprising a plurality of pouch cells. Further, the battery pack having a carbon fiber battery case may include a casing formed with carbon fiber, the casing having one or more carbon fiber separation sheets and, the casing configured to dissipate heat from the plurality of pouch cells in a direction along carbon fibers of the casing.

In another aspect, a method of manufacturing a battery pack having a carbon fiber battery case includes forming a plurality of pouch cells via one or more conductive foil tabs, forming a casing, wherein the casing is fabricated with carbon fiber, and enclosing, each pouch cell of the plurality of pouch cells, in the casing. Further the casing includes one or more separation sheets, is configured to dissipate heat from the plurality of pouch cells in a direction along carbon fibers of the casing.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

Figure 1:
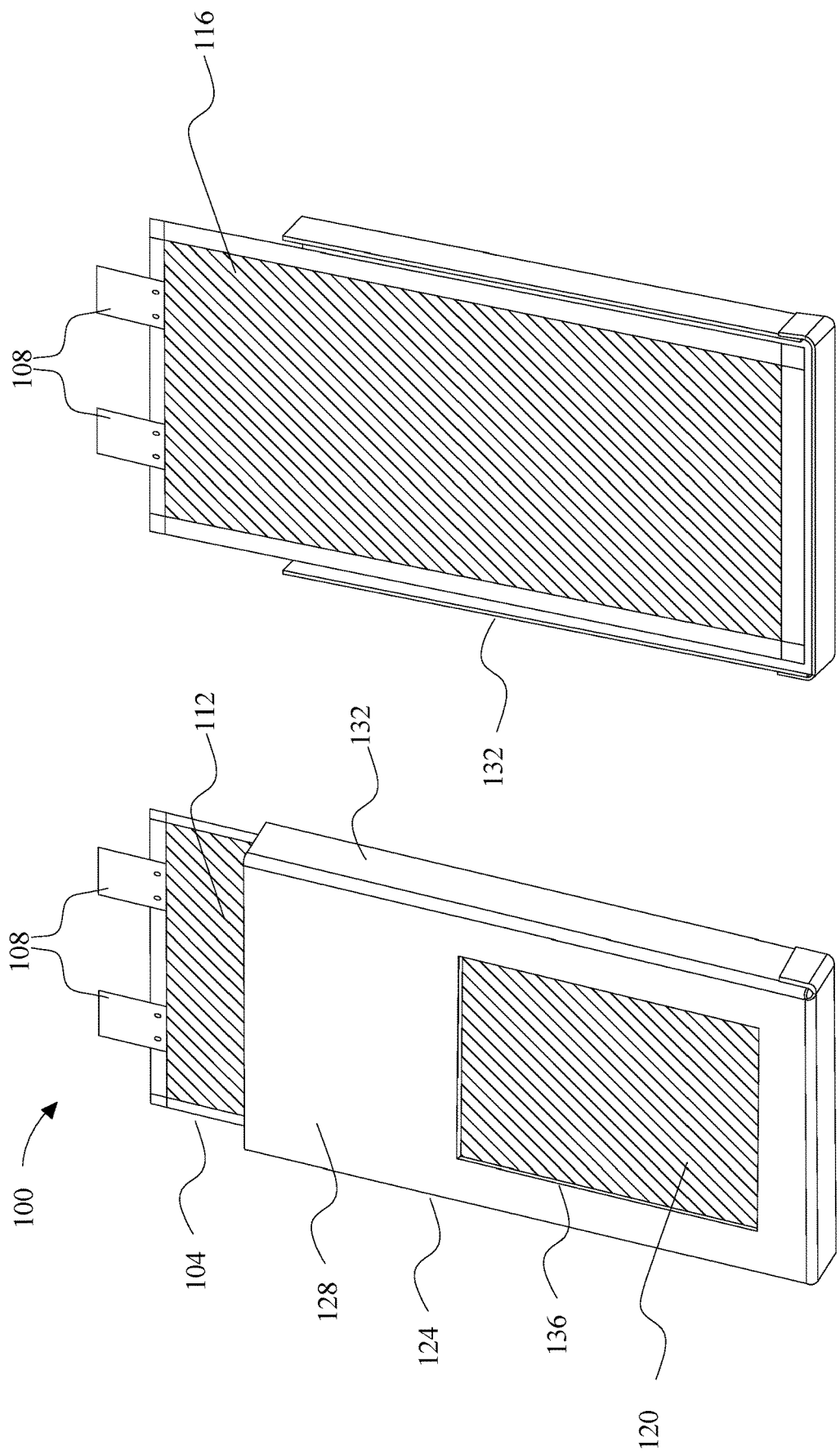
FIGS. 1A and B are schematic representation of exemplary embodiments of a system for pouch cell casing shown in front and reverse isometric views, in accordance with the present disclosure.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for a battery pack for preventing progression of thermal runaway between modules. In an embodiment, an electric vertical take-off and landing vehicle (eVTOL) may include a battery pack for preventing progression of thermal runaway between modules. Some embodiments include methods of manufacture for a battery pack for preventing progression of thermal runaway between modules.

Aspects of the present disclosure may reduce thermal runaway by enclosing battery cells with battery packs to efficiently dissipate heat. That is, carbon fiber has high thermal conductivity in plane such that any heat being dissipated along a carbon fiber may move more efficiently than heat dissipated in a direction orthogonal to the carbon fiber. As such, battery packs may be fabricated with carbon fiber such that heat may be tunneled out of the battery pack and the battery cells enclosed within the battery pack may be cooled. Additionally, adjacent battery packs may not experience residual heat from adjacent battery packs because of the reduction in thermal conductivity in the carbon fiber regarding heat moving in a direction orthogonal to the carbon fiber. Systems, devices, and methods relating to carbon fiber barriers in battery packs are disclosed in U.S. Non-Provisional application Ser. No. 17/514,981, filed on Oct. 29, 2021, and entitled "SYSTEM AND METHOD FOR MANUFACTURING A FREEFORM SHAPE FOR AN ELEXTRIC AIRCRAFT,", and U.S. Non-Provisional application Ser. No. 17/348,516, filed on Jun. 15, 2021, and entitled "SYSTEM FOR BATTERY MANAGEMENT OF A BATTERY PACK IN ELECTRIC AIRCRAFT,", the entirety of both applications are incorporated herein by reference.

Referring now to FIGS. 1A and 1B, a battery pack 100 for a battery case configured for use in an electric aircraft is shown in front and reverse views. Battery pack 100 includes at least a pouch cell 104. As used in this disclosure, "pouch cell" is a battery cell or module that includes a pouch. In some cases, a pouch cell may include or be referred to as a prismatic pouch cell, for example when an overall shape of pouch is prismatic. In some cases, a pouch cell may include a pouch which is substantially flexible. Alternatively, or additionally, in some cases, pouch may be substantially rigid. At least a pouch cell 104 may include at least a pair of electrodes. At least a pair of electrodes may include a positive electrode and a negative electrode. Each electrode of at least a pair of electrodes may include an electrically conductive element. Non-limiting exemplary electrically conductive elements include braided wire, solid wire, metallic foil, circuitry, such as printed circuit boards, and the like. Battery pack 100 includes at least a pair of foil tabs 108. At least a pair of electrodes may be in electric communication with at least a pair of foil tabs 108. At least a pair of electrodes may be bonded in electric communication with at least a pair of foil tabs 108 by any known method, including without limitation welding, brazing, soldering, adhering, engineering fits, electrical connectors, and the like. In some cases, at least a pair of foil tabs may include a cathode and an anode. In some cases, an exemplary cathode may include a lithium-based substance, such as lithium-metal oxide, bonded to an aluminum foil tab. In some cases, an exemplary anode may include a carbon-based substance, such as graphite, bonded to a copper tab. At least a pair of foil tabs 108 may electrically connected to a bus bar. For the purposes of this disclosure, a "bus bar or bus" is an electrically conductive pathway connecting at least a component in a system configured to convey electrical energy between components. The bus bar may include one or more electrically conductive pathways configured to transfer electrical energy across the pathways to convey electrical energy from one component to one or more other components. Bus bar may include, without limitation, one or more metallic strips and/or bars. Bus bar may include a ring bus. For the purpose of this disclosure, a "ring bus" is a bus element wherein circuit breakers are connected to form a ring with isolators on both sides of each circuit breaker. Ring bus may include component configured to isolate a fault by tripping two circuit breakers while all other circuits remain in service. Bus bar may be disposed in or on a switchgear, panel board, busway enclosure, a plurality of energy storage elements, any portion of electric aircraft, a plurality of propulsors, or a combination thereof. A bus bar may also be used to connect high voltage equipment at electrical switchyards, and low voltage equipment in plurality of energy storage elements. Bus bar may be uninsulated; bus bar may have sufficient stiffness to be supported in air by insulated pillars. These features allow sufficient cooling of the conductors, and the ability to tap in at various points without creating a new joint. A bus bar may include material composition and cross-sectional size configured to conduct electricity where the size and material determine the maximum amount of current that can be safely carried. A bus bar may be produced in a plurality of shapes including flat strips, solid bars, rods, or a combination thereof. A bus bar may be composed of copper, brass, aluminum as solid or hollow tubes, in embodiments. A bus bar may include flexible buses wherein thin conductive layers are sandwiched together; such an arrangement may include a structural frame and/or cabinet configured to provide rigidity to bus bar. A bus bar may include distribution boards configured to split the electrical supply into separate circuits at one location. Busways, or bus ducts, are long busbars with a protective cover. Rather than branching from the main supply at one location, they allow new circuits to branch off anywhere along the route of the busway. Bus bar may either be supported on insulators, or else insulation may completely surround it. Bus bars are protected from accidental contact either by an enclosure or by design configured to remove it from reach. Bus bar may be connected to each other and to electrical apparatus by bolted, clamped, or welded connections. Joints between high-current bus bar sections have precisely machined matching surfaces that are silver-plated to reduce the contact resistance. Electrical bus may refer to power busses, audio busses, video busses, computing address busses, and/or data busses.

With continued reference to FIGS. 1A and 1B, pouch cell 104 may be consistent with any pouch cell disclosed in U.S. application Ser. No. 17/404,500, filed on Aug. 17, 2021, and entitled "STACK BATTERY PACK FOR ELECTRIC VERTICAL TAKE-OFF AND LANDING AIRCRAFT," or U.S. application Ser. No. 17/475,743, filed on Sep. 15, 2021, and entitled "BATTERY SYSTEM AND METHOD OF AN ELECTRIC AIRCRAFT WITH SPRING CONDUCTORS," both of which are hereby incorporated by reference in their entirety.

An at least a pouch cell 104 may include an insulator layer. As used in this disclosure, an "insulator layer" is an electrically insulating material that is substantially permeable to battery ions, such as without limitation lithium ions. In some cases, insulator layer may be referred to as a separator layer or simply separator. In some cases, insulator layer may be included and configured to prevent electrical communication directly between at least a pair of foil tabs 108 (e.g., cathode and anode). In some cases, an insulator layer may be configured to allow for a flow of ions across it. An insulator layer may consist of a polymer, for example polyolifine (PO). An insulator layer may include pours which are configured to allow for passage of ions, for example lithium ions. In some cases, pours of a PO insulator layer may have a width no greater than 100 μm, 10 μm, or 0.1 μm. In some cases, a PO insulator layer may have a thickness within a range of 1-100 μm, or 10-30 μm. At least a pouch cell 104 includes battery cell 112.

With continued reference to FIGS. 1A and 1B, battery cell 112 may include Li ion batteries which may include NCA, NMC, Lithium iron phosphate (LiFePO4) and Lithium Manganese Oxide (LMO) batteries, which may be mixed with another cathode chemistry to provide more specific power if the application requires Li metal batteries, which have a lithium metal anode that provides high power on demand, Li ion batteries that have a silicon, tin nanocrystals, graphite, graphene or titanate anode, or the like. Batteries and/or battery modules may include without limitation batteries using nickel-based chemistries such as nickel cadmium or nickel metal hydride, batteries using lithium-ion battery chemistries such as a nickel cobalt aluminum (NCA), nickel manganese cobalt (NMC), lithium iron phosphate (LiFePO4), lithium cobalt oxide (LCO), and/or lithium manganese oxide (LMO), batteries using lithium polymer technology, metal-air batteries. Battery cell 112 may include lead-based batteries such as without limitation lead acid batteries and lead carbon batteries. Battery cell 112 may include lithium sulfur batteries, magnesium ion batteries, and/or sodium ion batteries. Batteries may include solid state batteries or supercapacitors or another suitable energy source. Batteries may be primary or secondary or a combination of both. Persons skilled in the art, upon reviewing the entirety of this disclosure, will be aware of various devices of components that may be used as a battery module.

With continued reference to FIGS. 1A and 1B, at least a pouch cell 104 may include a pouch 116. Pouch 116 is configured to substantially encompass at least a pair of foil tabs 108, battery cell 112, and includes at least a first side 120. In some cases, pouch 116 may include a polymer, such as without limitation polyethylene, acrylic, polyester, and the like. In some case, pouch 116 may be coated with one or more coatings. For example, in some cases, pouch may have an outer surface coated with a metalizing coating, such as an aluminum or nickel containing coating. In some cases, pouch coating be configured to electrically ground and/or isolate pouch, increase pouches impermeability, increase pouches resistance to high temperatures, increases pouches thermal resistance (insulation), and the like. An electrolyte may be located within pouch 116. In some cases, an electrolyte may include a liquid, a solid, a gel, a paste, and/or a polymer. An electrolyte may wet or contact one or both of at least a pair of foil tabs 108. At least a pair of foil tabs 108 of a pouch cell 104 may be configured to be electrically connected to one or more other pairs of cell tabs similar to or the same as the at least a pair of foil tabs 108. At least a pouch cell 104 may be disposed in columns, rows, grids, stacks, layups, or other arrangements of a plurality of at least a pouch cell 104. At least a pouch cell 104 may be mechanically, electrically, and otherwise connected to proximate pouch cells in series, parallel, or a combination thereof. At least a pouch cell 104 may be disposed within a larger battery pack or module consistent with the description thereof herein.

With continued reference to FIGS. 1A and 1B, battery pack 100 includes a casing 124. Casing 124 is configured to substantially encompass the at least a pouch cell 104. Casing 124 is configured to create an ejecta barrier to block, arrest, capture, catch, deflect, contain, otherwise direct one or more objects ejected from the at least a pouch cell 104. As used in this disclosure, an "ejecta barrier" is any material or structure that is configured to substantially block, contain, or otherwise prevent passage of ejecta. As used in this disclosure, "ejecta" is any material that has been ejected, for example from a battery cell. In some cases, ejecta may be ejected during thermal runaway of a battery cell. In some cases, ejecta may include hot matter, which if left uncontained could transfer heat to other, e.g., neighboring, pouch cells. By preventing hot ejecta from reaching pouch cells casing 124 may aid in preventing progression of thermal runaway between battery cells within a battery pack in which the herein battery pack 100 is disposed. In some cases, ejecta may include combustible materials, which if left uncontained could settle upon other, e.g., neighboring, pouch cells. Combustible materials once combustion conditions are met may combust generating an exothermic reaction, which can induce thermal runaway on nearby battery cells. Combustion conditions can include presence of oxygen, fuel, spark, flash point, fire point, and/or autoignition temperature. Alternatively or additionally, in some cases, eject may be ejected without thermal runaway of a battery cell. In some cases, ejecta may include lithium-based compounds. Alternatively or additionally, ejecta may include carbon-based compounds, such as without limitation carbonate esters. Ejecta may include matter in any phase or form, including solid, liquid, gas, vapor, and the like. In some cases, ejecta may undergo a phase change, for example ejecta may be vaporous as it is initially being ejected and then cool and condense into a solid or liquid after ejection. In some cases, casing 124 may be configured to prevent materials ejected from at least a pouch cell 104. For example, in some instances casing 124 is substantially impermeable to ejecta from battery at least a pouch cell 104. In some embodiments, casing 124 may include a lithiophobic material. As used in this disclosure, a "lithiophobic material" is any material that has conductive properties. In some embodiments, casing 124 may include titanium or one or more titanium alloys. Pouch cell 104 may include one or more metallic materials or metal alloys including steel. Pouch cell 104 may be manufactured in a plurality of methods including welding, casting, molding, forging, and the like. In some embodiments, casing 124 may include carbon fiber. In some cases, an ejecta barrier may include at least a one of a lithiophilic or a lithiophobic material or layer, configured to absorb and/or repel lithium-based compounds. In some cases, an ejecta barrier may include a lithiophilic metal coating, such as silver or gold. In some cases, an ejecta barrier may be flexible and/or rigid. In some cases, an ejecta barrier may include a sheet, a film, a foil, or the like. Alternatively or additionally, in some cases, casing 124 may include rigid and/or structural elements, for instance which are solid. Casing 124 may include metals, composites and the like. In some cases, an ejecta barrier may be further configured to structurally support at least a pouch cell 104. For example in some cases, at least a pouch cell 104 may be mounted to a rigid an ejecta barrier.

With continued reference to FIGS. 1A and 1B, battery pack 100 includes a first face 128 disposed parallel and adjacent to first side 120. In some cases, first face 128 is constructed in a manner that blocks ejecta, while preventing ejecta from one pouch cell from interacting with another pouch cell disposed adjacent, above, below, or near at least a pouch cell 104. Casing 124 includes a second face 132 disposed perpendicular to first face 128 and mechanically connected to first face 128 along one or more edges such that the edges of first face 128 and second face 132 are mechanically connected at their respective edges and meet to create a corner and/or seam. In embodiments, wherein first face 128 and second face 132 are made of metallic material, or suitable material for welding, first face 128 and second face 132 are mechanically connected by welding. Welding includes tack welding, MIG welding, Gas Metal Arc Welding (GMAW), TIG welding, Gas Tungsten Arc Welding (GTAW), Shielded Metal Arc Welding (SMAW), and Flux-cored Arc Welding (FCAW). In embodiments, first face 128 and second face 132 are molded and/or adhesive bonded. In embodiments, any components, when the material is suitable for manufacture and bonding, any components described herein may include molding and or adhesive bonding, such as when the components include carbon fiber or other epoxy-impregnated fibers. In some embodiments casing 124 may include more than two faces mechanically connected. For example, casing 124 may include three faces having rectangular flat shapes with a certain thickness constructed of sheet metal. In this example casing 124 may have those three faces welded at their respective edges such that the resulting casing 124 may surround the center of casing 124 on three sides. There are near limitless arrangements of faces and mechanical connection casing 124 could have. In non-limiting embodiments casing 124 may have five faces mechanically connected at their respective edges including two sets of opposite and opposing faces and an orthogonal face, that is to say casing 124 may take the shape of a die with one face missing. Casing 124 is not limited to having rectangular faces. One of ordinary skill in the art would appreciate, after reviewing the entirety of this disclosure, that casing 124 may include first face 128, second face 132, and/or any other number of faces having triangular, pentagonal, hexagonal, or any other polygonal shape, each being regular, symmetrical, or otherwise.

With continued reference to FIGS. 1A and 1B, battery pack 100 includes at least an opening 136 disposed on and through a portion of first face 128. At least an opening 136 may include a polygonal cut-through of first face 128 such that there is a path from one side of first face 128 to the opposite and opposing side of first face 128 through at least an opening 136. At least an opening 136 may include any polygonal shape in substantially flat first face 128 such as a square, rectangle, circle, oval, triangle and in any pattern or number thereof. At least an opening 136 may include slots, grating, slits, patterns of holes, grids, ranks, columns, rows, or other arrangements of at least an opening 136. At least an opening 136 may be punched, sawn, cast, molded, forged, drilled, milled, additively manufactured (various forms of three-dimensional (3D) printing), electrical discharged machined (EDM), machined, turned, or any other suitable method of manufacture. At least an opening 136 may be configured to reduce weight of casing 124. At least an opening 136 may be disposed on and through a portion of casing 124 configured to not be impacted in the event ejecta strikes casing 124. At least an opening 136 may include duck bills, teeth, edges, or other mechanical features configured to arrest liquid ejecta disposed on the edges of at least an opening 136.

With continued reference to FIGS. 1A and 1B, battery pack 100 may include at least a vent as previously disclosed. In some cases, at least a vent may be configured to vent ejecta from at least a pouch cell 104. In some cases, at least a vent may be configured to vent ejecta along a flow path. A flow path may substantially exclude components within battery pack 100, for example fluids flowing along the flow path may be cordoned away from contact with components disposed near the flow path. For example, a flow path may be configured to not intersect with any surface of second pouch cell. A flow path may include any channel, tube, hose, conduit, or the like suitable for facilitating fluidic communication, for example with a at least a pouch cell 104. In some cases, the flow path may include a check valve. As used in this disclosure, a "check valve" is a valve that permits flow of a fluid only in certain, for example one, direction. In some cases, the check valve may be configured to allow flow of fluids substantially only away from battery at least a pouch cell 104, while preventing back flow of vented fluid to the battery at least a pouch cell 104. In some cases, the check valve may include a duckbill check valve. In some cases, a duckbill check valve may have lips which are substantially in a shape of a duckbill. Lips may be configured to open to allow forward flow (out of the lips), while remaining normally closed to prevent backflow (into the lips). In some cases, duckbill lips may be configured to automatically close (remain normally closed), for example with use of a compliant element, such as without limitation an elastomeric material, a spring, and the like. According to some embodiments, vent may have a vacuum applied to aid in venting of ejecta.

Figure 2:
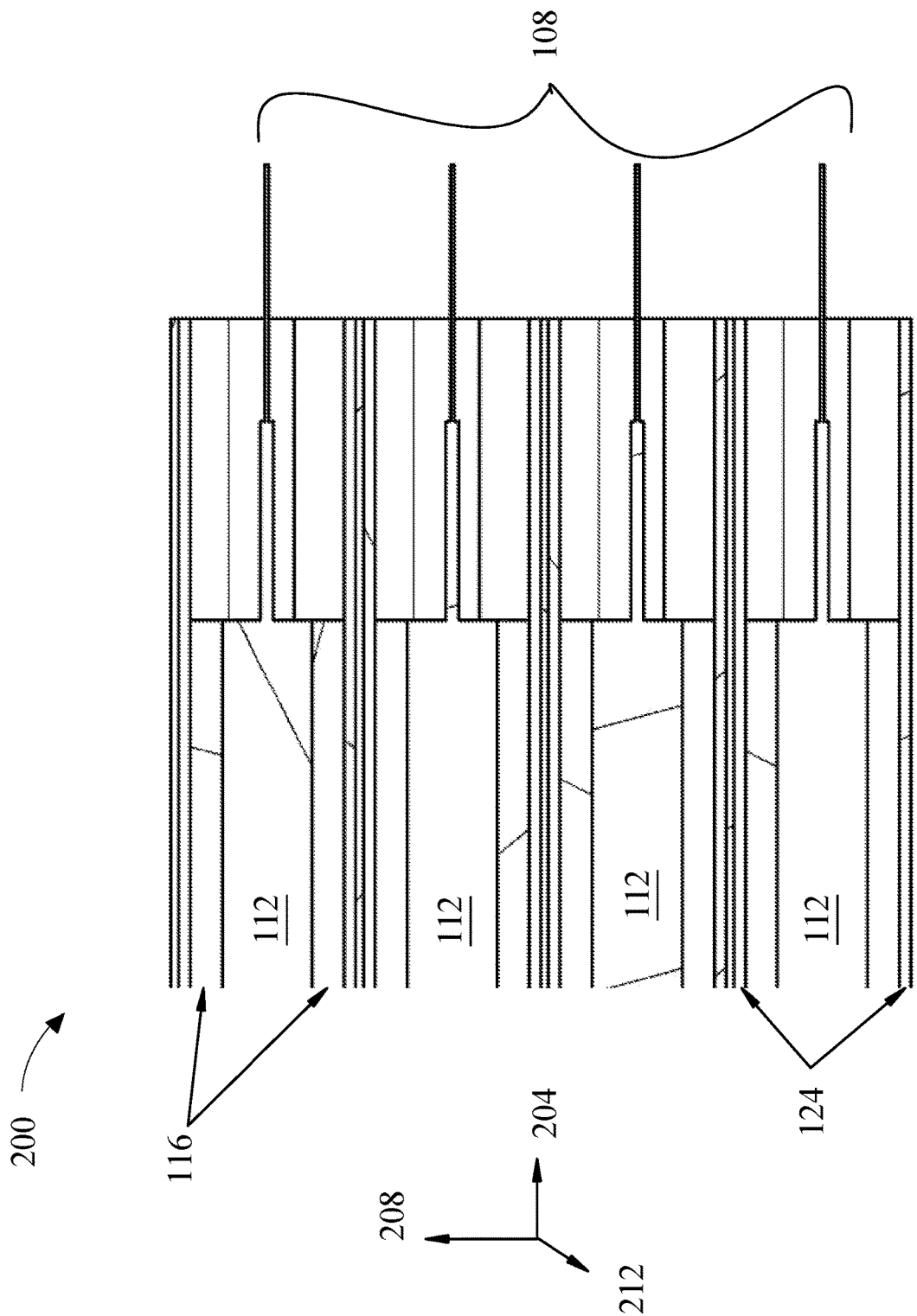
FIG. 2 is a schematic representation of an exemplary embodiment of a battery pack, in accordance with the present disclosure.

Now turning to FIG. 2, a side view of multiple battery packs 200 is shown. As illustrated, multiple battery packs 200 are vertically stacked on top of one another. That is, the perspective shown in FIG. 2 may be from viewing battery pack 100 from second face 132. However, the perspective shown in FIG. 2 is not limited to the point of view from face 132, since battery pack 100 may be formed in a rectangular prism shape. It should be noted that FIG. 2 illustrates multiple battery packs 200 vertically stacked as exemplary embodiment. It should be appreciated that any number and/or orientation of battery packs 100 may be employed due to design and/or cost considerations.

Continuing to refer to FIG. 2, battery pack 200 may include casing 124 around each pouch 116. In some embodiments, casing 124 may be a carbon fiber casing. It may be advantageous to form casing 124 with carbon fiber due to the thermal properties of carbon fiber. For example, in a direction along a carbon fiber, thermal conductivity is high, whereas in a direction orthogonal to the carbon fiber thermal conductivity is reduced. Referring to orthogonal axes shown by arrows 204-212, carbon fibers of casing 124 may extend along axis 204. Thus, heat produced by battery cell 112 may travel along carbon fibers of casing 124 along axis 204. On the other hand, heat produced by battery cell 112 that travels along axis 208 may be halted prior to reaching an adjacent battery pack 100.

As mentioned herein, thermal runaway occurs when battery cell 112 overheats and contributes to further overheating of the battery cell 112 in an uncontrolled positive feedback loop. As such, it may be advantageous to dissipate heat produced by a single battery cell 112 from a battery pack 100 such that adjacent battery packs, and subsequently battery cells, do not overheat. Fabricating casing 124 with carbon fiber may allow heat produced by battery cell 112 along fibers of the casing 124 to a release outlet. In some instances, a release outlet may be a conduit, valve, or the like. Continuing discussion regarding casing 124, the casing 124 may prevent heat produced by battery cell 112 from travelling upwards or downwards (e.g., along axis 208) to an additional battery pack 100 containing an additional battery cell 112. Because, as a result of the carbon fibers of casing 124 extending along axis 204, the heat travelling upwards or downwards (e.g., along axis 208) would be travelling in a direction perpendicular to carbon fibers of casing 124, thermal conductivity upwards or downwards (e.g., along axis 208) is significantly reduced. As a non-limiting example, the thermal conductivity along the carbon fibers of casing 124 may be 4 to 10 times higher than the thermal conductivity perpendicular to the carbon fibers of casing 124. Reducing thermal conductivity may be beneficial not only to the battery cell producing the heat, but also the surrounding battery cells, as well as the aircraft the battery cells will be installed in.

Still referring to FIG. 2, casing 124 may be formed with a smooth internal surface. That is, an inner surface of casing 124 abutting an outer portion of pouch 116 may be formed with smooth carbon fiber sheets. Forming inner surface of casing 124 with carbon fiber sheets and a smooth internal surface may enable the inner surface of casing 124 to better absorb heat from pouch 116 and tunnel or transfer the absorbed heat out of the casing 124. Additionally, the smooth internal or inner surface may enable a more efficient diffusion of battery ejecta from casing 124. Thus, forming an inner surface of casing 124 with smooth carbon fiber may enable efficient effusion of both battery ejecta and heat produced by battery cells 112 out of casing 124.

In some embodiments, casing 124 may be thermally coupled to a heat sink. A "heat sink", as described herein, is a heat exchanger that transfers heat generated by a device to a fluid medium such as air or liquid coolant. In some instances, casing 124 may direct heat and/or battery ejecta out of an electric aircraft into ambient air and/or heat sink. Additionally, or alternatively, casing 124 may direct heat and/or battery ejecta into any suitable waste receptacle on an electric aircraft.

Referring back to heat sink, the heat sink may be a heat spreader, a heat pipe, or anything of the like. In some embodiments, heat spreader may transfer heat from a hotter source to a colder heat sink. In some instances, a passive heat spreader is employed to facilitate heat transfer. In another instance, an active heat spreader is employed to speed up heat transfer by utilizing external energy supplied by a source external to casing 124. In some embodiments, a heat pipe is employed to take advantage of phase transitions of a substance to transfer heat between two solid surfaces. While two particular examples of a heat sink are described herein, it should be noted that any suitable heat sink may be employed to satisfy cost considerations, structure considerations, or anything of the like.

Figure 3:
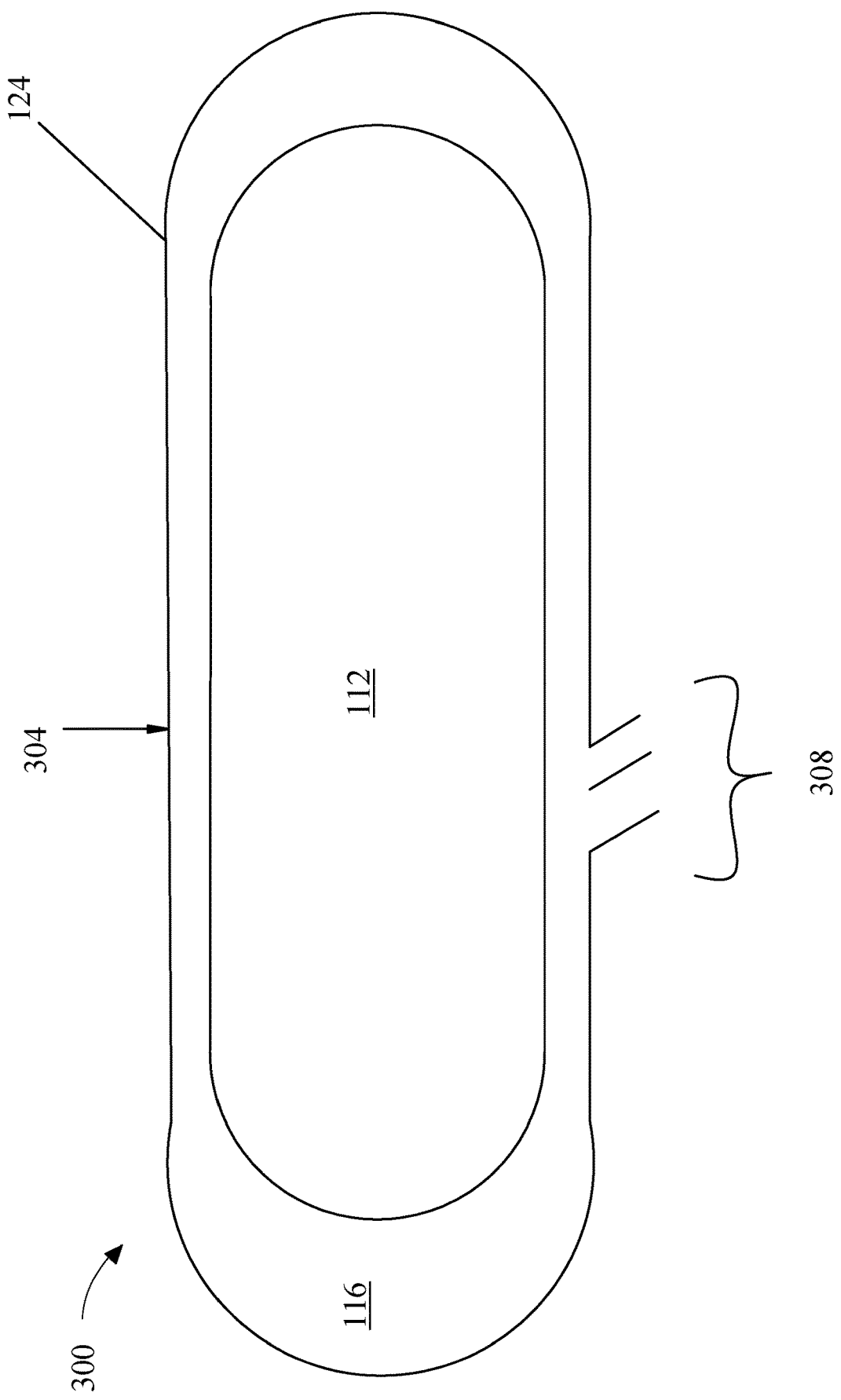
FIG. 3 is a schematic diagram of an exemplary embodiment of a battery pack with curved corners, in accordance with the present disclosure.

Turning now to FIG. 3, battery pack 300 may be formed by an outer surface 304 with a curvature to maintain internal pressure via hoop strength. That is, forming battery pack 300 with curved corners rather sharp corners may enable battery pack 300 to better maintain an internal pressure. Forming battery pack 300 with curved corners may create differentiable curve cross-sections throughout the battery pack 300. As such, stress may be calculated according to:

$$\text{Stress} = \frac{\pi r^2 P}{2\pi rt} = \frac{Pr}{2t}$$

where, r is radius of the cylinder, P is pressure, and t is thickness of casing wall. Force at end of the cylinder may be found according to:

$$\text{Force} = \pi r^2 P$$

A component that may heavily impact shape of battery pack 300 is pressure. Battery pack 300 may be far lighter if pressure is resisted in tension as compared to bending, compression, and/or shear. In some embodiments, tension in a casing may be generally achieved by shapes that provide a generally round cross section, including spheres, cylinders, and cones. In an embodiment, a pressurized casing of a given volume may be made as a sphere to place battery pack 300 in pure tension. As discussed herein, "negligible" is a value significantly smaller than the average magnitude of any other value of the same unit of measurement measured and/or discussed. In some cases, constructing a battery pack 300 with thin walls (i.e., a thickness less than 1/10 of the radius) allows for a thin wall approximation to be made. Alternatively, a casing made as a cube may require casing walls to operate while subjected to and/or resisting bending, shear, and/or compression; thus, the cube casing would be vastly heavier than a sphere casing of similar volume. Accordingly, in some embodiments, any casing geometry may provide casing walls acting in tension.

Still referring to FIG. 3, battery pack 300 may include one or more cooling fins 308. One or more cooling fans may be incorporated to direct heat and/or battery ejecta of out battery pack 300 to a heat sink and/or a waste receptacle. In some embodiments, one or more cooling fins 308 may be fluidly connected to one or more conduits that direct any heat and/or battery ejecta to a heat sink or waste receptable. That is, one or more cooling fins 308 may be positioned on casing 124 along carbon fibers such that the thermal diffusion from the casing is not lessened due to reduction of thermal conductivity of carbon fiber directionality.

Figure 4:
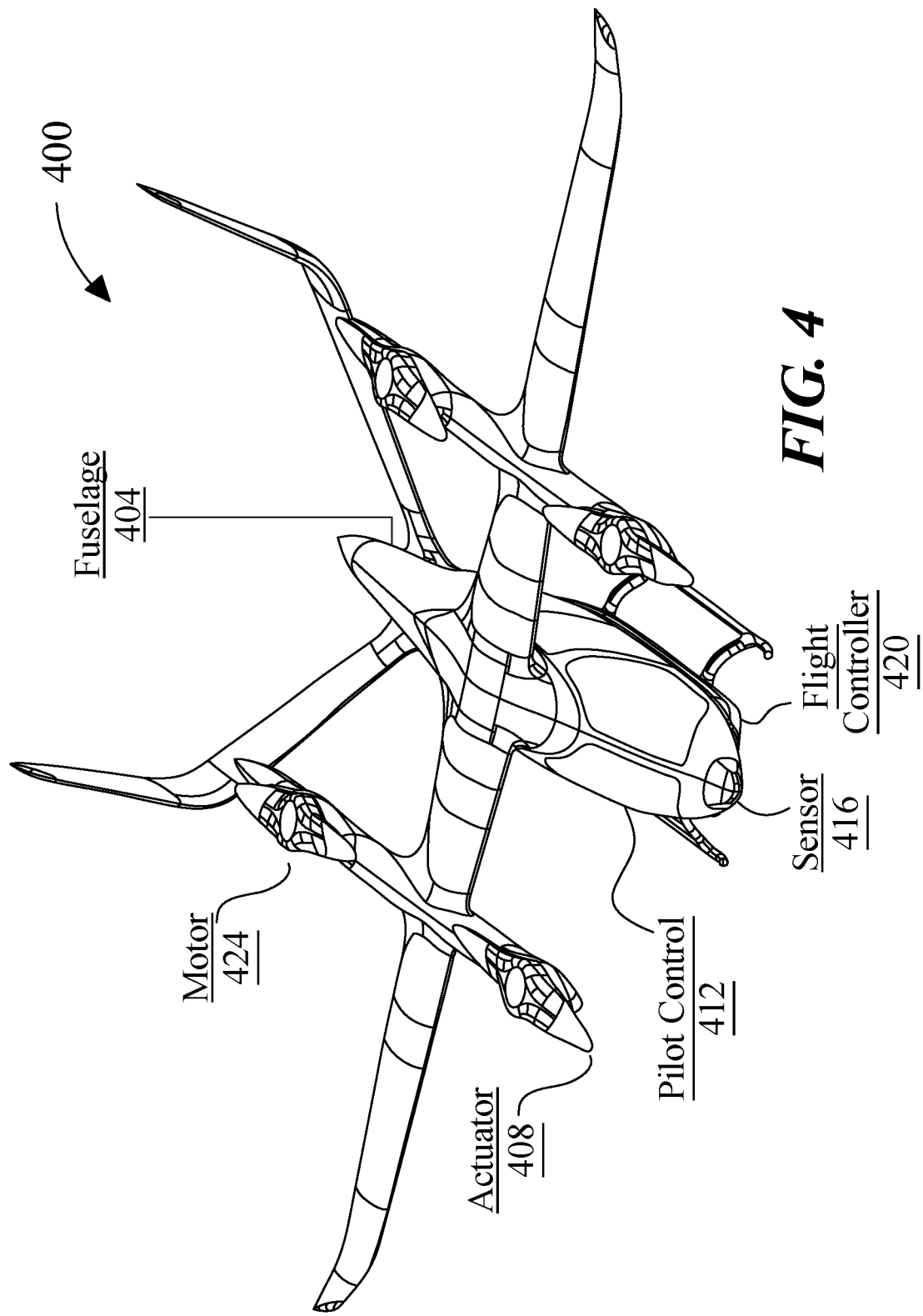
FIG. 4 is a schematic representation of an exemplary electric vertical take-off and landing vehicle, in accordance with the present disclosure.

Referring now to FIG. 4, an exemplary embodiment of an aircraft 400 is illustrated. Aircraft 400 may include an electrically powered aircraft. In some embodiments, electrically powered aircraft may be an electric vertical takeoff and landing (eVTOL) aircraft. Electric aircraft may be capable of rotor-based cruising flight, rotor-based takeoff, rotor-based landing, fixed-wing cruising flight, airplane-style takeoff, airplane-style landing, and/or any combination thereof "Rotor-based flight," as described in this disclosure, is where the aircraft generated lift and propulsion by way of one or more powered rotors coupled with an engine, such as a quadcopter, multi-rotor helicopter, or other vehicle that maintains its lift primarily using downward thrusting propulsors. "Fixed-wing flight," as described in this disclosure, is where the aircraft is capable of flight using wings and/or foils that generate lift caused by the aircraft's forward airspeed and the shape of the wings and/or foils, such as airplane-style flight.

Still referring to FIG. 4, aircraft 400 may include a fuselage 404. As used in this disclosure a "fuselage" is the main body of an aircraft, or in other words, the entirety of the aircraft except for the cockpit, nose, wings, empennage, nacelles, any and all control surfaces, and generally contains an aircraft's payload. Fuselage 404 may comprise structural elements that physically support the shape and structure of an aircraft. Structural elements may take a plurality of forms, alone or in combination with other types. Structural elements may vary depending on the construction type of aircraft and specifically, the fuselage. Fuselage 404 may comprise a truss structure. A truss structure may be used with a lightweight aircraft and may include welded aluminum tube trusses. A truss, as used herein, is an assembly of beams that create a rigid structure, often in combinations of triangles to create three-dimensional shapes. A truss structure may alternatively comprise titanium construction in place of aluminum tubes, or a combination thereof. In some embodiments, structural elements may comprise aluminum tubes and/or titanium beams. In an embodiment, and without limitation, structural elements may include an aircraft skin. Aircraft skin may be layered over the body shape constructed by trusses. Aircraft skin may comprise a plurality of materials such as aluminum, fiberglass, and/or carbon fiber, the latter of which will be addressed in greater detail later in this paper.

Still referring to FIG. 4, aircraft 400 may include a plurality of actuators 408. In an embodiment, actuator 408 may be mechanically coupled to an aircraft. As used herein, a person of ordinary skill in the art would understand "mechanically coupled" to mean that at least a portion of a device, component, or circuit is connected to at least a portion of the aircraft via a mechanical coupling. Said mechanical coupling can include, for example, rigid coupling, such as beam coupling, bellows coupling, bushed pin coupling, constant velocity, split-muff coupling, diaphragm coupling, disc coupling, donut coupling, elastic coupling, flexible coupling, fluid coupling, gear coupling, grid coupling, Hirth joints, hydrodynamic coupling, jaw coupling, magnetic coupling, Oldham coupling, sleeve coupling, tapered shaft lock, twin spring coupling, rag joint coupling, universal joints, or any combination thereof. As used in this disclosure an "aircraft" is vehicle that may fly. As a non-limiting example, aircraft may include airplanes, helicopters, airships, blimps, gliders, paramotors, and the like thereof. In an embodiment, mechanical coupling may be used to connect the ends of adjacent parts and/or objects of an electric aircraft. Further, in an embodiment, mechanical coupling may be used to join two pieces of rotating electric aircraft components.

With continued reference to FIG. 4, a plurality of actuators 408 may be configured to produce a torque. As used in this disclosure a "torque" is a measure of force that causes an object to rotate about an axis in a direction. For example, and without limitation, torque may rotate an aileron and/or rudder to generate a force that may adjust and/or affect altitude, airspeed velocity, groundspeed velocity, direction during flight, and/or thrust. For example, plurality of actuators 408 may include a component used to produce a torque that affects aircrafts' roll and pitch, such as without limitation one or more ailerons. An "aileron," as used in this disclosure, is a hinged surface which form part of the trailing edge of a wing in a fixed wing aircraft, and which may be moved via mechanical means such as without limitation servomotors, mechanical linkages, or the like. As a further example, plurality of actuators 408 may include a rudder, which may include, without limitation, a segmented rudder that produces a torque about a vertical axis. Additionally or alternatively, plurality of actuators 408 may include other flight control surfaces such as propulsors, rotating flight controls, or any other structural features which can adjust movement of aircraft 400. Plurality of actuators 408 may include one or more rotors, turbines, ducted fans, paddle wheels, and/or other components configured to propel a vehicle through a fluid medium including, but not limited to air.

Still referring to FIG. 4, plurality of actuators 408 may include at least a propulsor component. As used in this disclosure a "propulsor component" is a component and/or device used to propel a craft by exerting force on a fluid medium, which may include a gaseous medium such as air or a liquid medium such as water. In an embodiment, when a propulsor twists and pulls air behind it, it may, at the same time, push an aircraft forward with an amount of force and/or thrust. More air pulled behind an aircraft results in greater thrust with which the aircraft is pushed forward. Propulsor component may include any device or component that consumes electrical power on demand to propel an electric aircraft in a direction or other vehicle while on ground or in-flight. In an embodiment, propulsor component may include a puller component. As used in this disclosure a "puller component" is a component that pulls and/or tows an aircraft through a medium. As a non-limiting example, puller component may include a flight component such as a puller propeller, a puller motor, a puller propulsor, and the like. Additionally, or alternatively, puller component may include a plurality of puller flight components. In another embodiment, propulsor component may include a pusher component. As used in this disclosure a "pusher component" is a component that pushes and/or thrusts an aircraft through a medium. As a non-limiting example, pusher component may include a pusher component such as a pusher propeller, a pusher motor, a pusher propulsor, and the like. Additionally, or alternatively, pusher flight component may include a plurality of pusher flight components.

In another embodiment, and still referring to FIG. 4, propulsor may include a propeller, a blade, or any combination of the two. A propeller may function to convert rotary motion from an engine or other power source into a swirling slipstream which may push the propeller forwards or backwards. Propulsor may include a rotating power-driven hub, to which several radial airfoil-section blades may be attached, such that an entire whole assembly rotates about a longitudinal axis. As a non-limiting example, blade pitch of propellers may be fixed at a fixed angle, manually variable to a few set positions, automatically variable (e.g. a "constant-speed" type), and/or any combination thereof as described further in this disclosure. As used in this disclosure a "fixed angle" is an angle that is secured and/or substantially unmovable from an attachment point. For example, and without limitation, a fixed angle may be an angle of 2.2° inward and/or 1.7° forward. As a further non-limiting example, a fixed angle may be an angle of 2.6° outward and/or 2.7° backward. In an embodiment, propellers for an aircraft may be designed to be fixed to their hub at an angle similar to the thread on a screw makes an angle to the shaft; this angle may be referred to as a pitch or pitch angle which may determine a speed of forward movement as the blade rotates. Additionally or alternatively, propulsor component may be configured having a variable pitch angle. As used in this disclosure a "variable pitch angle" is an angle that may be moved and/or rotated. For example, and without limitation, propulsor component may be angled at a first angle of 2.3° inward, wherein propulsor component may be rotated and/or shifted to a second angle of 1.7° outward.

Still referring to FIG. 4, propulsor may include a thrust element which may be integrated into the propulsor. Thrust element may include, without limitation, a device using moving or rotating foils, such as one or more rotors, an airscrew or propeller, a set of airscrews or propellers such as contra-rotating propellers, a moving or flapping wing, or the like. Further, a thrust element, for example, can include without limitation a marine propeller or screw, an impeller, a turbine, a pump-jet, a paddle or paddle-based device, or the like.

With continued reference to FIG. 4, plurality of actuators 408 may include power sources, control links to one or more elements, fuses, and/or mechanical couplings used to drive and/or control any other flight component. Plurality of actuators 408 may include a motor that operates to move one or more flight control components and/or one or more control surfaces, to drive one or more propulsors, or the like. A motor may be driven by direct current (DC) electric power and may include, without limitation, brushless DC electric motors, switched reluctance motors, induction motors, or any combination thereof. Alternatively or additionally, a motor may be driven by an inverter. A motor may also include electronic speed controllers, inverters, or other components for regulating motor speed, rotation direction, and/or dynamic braking.

Still referring to FIG. 4, plurality of actuators 408 may include an energy source. An energy source may include, for example, a generator, a photovoltaic device, a fuel cell such as a hydrogen fuel cell, direct methanol fuel cell, and/or solid oxide fuel cell, an electric energy storage device (e.g. a capacitor, an inductor, and/or a battery). An energy source may also include a battery cell, or a plurality of battery cells connected in series into a module and each module connected in series or in parallel with other modules. Energy source may include a battery pack, for example as described in reference to FIGS. 1A and 1B. Configuration of an energy source containing connected modules may be designed to meet an energy or power requirement and may be designed to fit within a designated footprint in an electric aircraft in which system may be incorporated.

In an embodiment, and still referring to FIG. 4, an energy source may be used to provide a steady supply of electrical power to a load over a flight by an electric aircraft 400. For example, energy source may be capable of providing sufficient power for "cruising" and other relatively low-energy phases of flight. An energy source may also be capable of providing electrical power for some higher-power phases of flight as well, particularly when the energy source is at a high SOC, as may be the case for instance during takeoff. In an embodiment, energy source may include an emergency power unit which may be capable of providing sufficient electrical power for auxiliary loads including without limitation, lighting, navigation, communications, de-icing, steering or other systems requiring power or energy. Further, energy source may be capable of providing sufficient power for controlled descent and landing protocols, including, without limitation, hovering descent or runway landing. As used herein the energy source may have high power density where electrical power an energy source can usefully produce per unit of volume and/or mass is relatively high. As used in this disclosure, "electrical power" is a rate of electrical energy per unit time. An energy source may include a device for which power that may be produced per unit of volume and/or mass has been optimized, for instance at an expense of maximal total specific energy density or power capacity. Non-limiting examples of items that may be used as at least an energy source include batteries used for starting applications including Li ion batteries which may include NCA, NMC, Lithium iron phosphate (LiFePO4) and Lithium Manganese Oxide (LMO) batteries, which may be mixed with another cathode chemistry to provide more specific power if the application requires Li metal batteries, which have a lithium metal anode that provides high power on demand, Li ion batteries that have a silicon or titanite anode, energy source may be used, in an embodiment, to provide electrical power to an electric aircraft or drone, such as an electric aircraft vehicle, during moments requiring high rates of power output, including without limitation takeoff, landing, thermal de-icing and situations requiring greater power output for reasons of stability, such as high turbulence situations, as described in further detail below. A battery may include, without limitation a battery using nickel based chemistries such as nickel cadmium or nickel metal hydride, a battery using lithium ion battery chemistries such as a nickel cobalt aluminum (NCA), nickel manganese cobalt (NMC), lithium iron phosphate (LiFePO4), lithium cobalt oxide (LCO), and/or lithium manganese oxide (LMO), a battery using lithium polymer technology, lead-based batteries such as without limitation lead acid batteries, metal-air batteries, or any other suitable battery. Persons skilled in the art, upon reviewing the entirety of this disclosure, will be aware of various devices of components that may be used as an energy source.

Still referring to FIG. 4, an energy source may include a plurality of energy sources, referred to herein as a module of energy sources. Module may include batteries connected in parallel or in series or a plurality of modules connected either in series or in parallel designed to satisfy both power and energy requirements. Connecting batteries in series may increase a potential of at least an energy source which may provide more power on demand. High potential batteries may require cell matching when high peak load is needed. As more cells are connected in strings, there may exist a possibility of one cell failing which may increase resistance in module and reduce overall power output as voltage of the module may decrease as a result of that failing cell. Connecting batteries in parallel may increase total current capacity by decreasing total resistance, and it also may increase overall amp-hour capacity. Overall energy and power outputs of at least an energy source may be based on individual battery cell performance or an extrapolation based on a measurement of at least an electrical parameter. In an embodiment where energy source includes a plurality of battery cells, overall power output capacity may be dependent on electrical parameters of each individual cell. If one cell experiences high self-discharge during demand, power drawn from at least an energy source may be decreased to avoid damage to a weakest cell. Energy source may further include, without limitation, wiring, conduit, housing, cooling system and battery management system. Persons skilled in the art will be aware, after reviewing the entirety of this disclosure, of many different components of an energy source. Exemplary energy sources are disclosed in detail in U.S. patent application Ser. No. 16/948,157 and Ser. No. 16/048,140 both entitled "SYSTEM AND METHOD FOR HIGH ENERGY DENSITY BATTERY MODULE" by S. Donovan et al., which are incorporated in their entirety herein by reference.

Still referring to FIG. 4, according to some embodiments, an energy source may include an emergency power unit (EPU) (i.e., auxiliary power unit). As used in this disclosure an "emergency power unit" is an energy source as described herein that is configured to power an essential system for a critical function in an emergency, for instance without limitation when another energy source has failed, is depleted, or is otherwise unavailable. Exemplary non-limiting essential systems include navigation systems, such as MFD, GPS, VOR receiver or directional gyro, and other essential flight components, such as propulsors.

Still referring to FIG. 4, another exemplary actuator may include landing gear. Landing gear may be used for take-off and/or landing/Landing gear may be used to contact ground while aircraft 400 is not in flight. Exemplary landing gear is disclosed in detail in U.S. patent application Ser. No. 17/196,719 entitled "SYSTEM FOR ROLLING LANDING GEAR" by R. Griffin et al., which is incorporated in its entirety herein by reference.

Still referring to FIG. 4, aircraft 400 may include a pilot control 412, including without limitation, a hover control, a thrust control, an inceptor stick, a cyclic, and/or a collective control. As used in this disclosure a "collective control" is a mechanical control of an aircraft that allows a pilot to adjust and/or control the pitch angle of the plurality of actuators 408. For example, and without limitation, collective control may alter and/or adjust the pitch angle of all of the main rotor blades collectively. For example, and without limitation pilot control 412 may include a yoke control. As used in this disclosure a "yoke control" is a mechanical control of an aircraft to control the pitch and/or roll. For example, and without limitation, yoke control may alter and/or adjust the roll angle of aircraft 400 as a function of controlling and/or maneuvering ailerons. In an embodiment, pilot control 412 may include one or more footbrakes, control sticks, pedals, throttle levels, and the like thereof. In another embodiment, and without limitation, pilot control 412 may be configured to control a principal axis of the aircraft. As used in this disclosure a "principal axis" is an axis in a body representing one three dimensional orientations. For example, and without limitation, principal axis or more yaw, pitch, and/or roll axis. Principal axis may include a yaw axis. As used in this disclosure a "yaw axis" is an axis that is directed towards the bottom of the aircraft, perpendicular to the wings. For example, and without limitation, a positive yawing motion may include adjusting and/or shifting the nose of aircraft 400 to the right. Principal axis may include a pitch axis. As used in this disclosure a "pitch axis" is an axis that is directed towards the right laterally extending wing of the aircraft. For example, and without limitation, a positive pitching motion may include adjusting and/or shifting the nose of aircraft 400 upwards. Principal axis may include a roll axis. As used in this disclosure a "roll axis" is an axis that is directed longitudinally towards the nose of the aircraft, parallel to the fuselage. For example, and without limitation, a positive rolling motion may include lifting the left and lowering the right wing concurrently.

Still referring to FIG. 4, pilot control 412 may be configured to modify a variable pitch angle. For example, and without limitation, pilot control 412 may adjust one or more angles of attack of a propeller. As used in this disclosure an "angle of attack" is an angle between the chord of the propeller and the relative wind. For example, and without limitation angle of attack may include a propeller blade angled 2.2°. In an embodiment, pilot control 412 may modify the variable pitch angle from a first angle of 2.71° to a second angle of 2.82°. Additionally or alternatively, pilot control 412 may be configured to translate a pilot desired torque for a flight component. For example, and without limitation, pilot control 412 may translate that a pilot's desired torque for a propeller be 160 lb. ft. of torque. As a further non-limiting example, pilot control 412 may introduce a pilot's desired torque for a propulsor to be 290 lb. ft. of torque. Additional disclosure related to pilot control 412 may be found in U.S. patent application Ser. No. 17/001,845 and Ser. No. 16/929,206 both of which are entitled "A HOVER AND THRUST CONTROL ASSEMBLY FOR DUAL-MODE AIRCRAFT" by C. Spiegel et al., which are incorporated in their entirety herein by reference.

Still referring to FIG. 4, aircraft 400 may include a loading system. A loading system may include a system configured to load an aircraft of either cargo or personnel. For instance, some exemplary loading systems may include a swing nose, which is configured to swing the nose of aircraft of the way thereby allowing direct access to a cargo bay located behind the nose. A notable exemplary swing nose aircraft is Boeing 647. Additional disclosure related to loading systems can be found in U.S. patent application Ser. No. 17/137,594 entitled "SYSTEM AND METHOD FOR LOADING AND SECURING PAYLOAD IN AN AIRCRAFT" by R. Griffin et al., entirety of which in incorporated herein by reference.

Still referring to FIG. 4, aircraft 400 may include a sensor 416. Sensor 416 may be configured to sense a characteristic of pilot control 412. Sensor may be a device, module, and/or subsystem, utilizing any hardware, software, and/or any combination thereof to sense a characteristic and/or changes thereof, in an instant environment, for instance without limitation a pilot control 412, which the sensor is proximal to or otherwise in a sensed communication with, and transmit information associated with the characteristic, for instance without limitation digitized data. Sensor 416 may be mechanically and/or communicatively coupled to aircraft 400, including, for instance, to at least a pilot control 412. Sensor 416 may be configured to sense a characteristic associated with at least a pilot control 412. An environmental sensor may include without limitation one or more sensors used to detect ambient temperature, barometric pressure, and/or air velocity, one or more motion sensors which may include without limitation gyroscopes, accelerometers, inertial measurement unit (IMU), and/or magnetic sensors, one or more humidity sensors, one or more oxygen sensors, or the like. Additionally or alternatively, sensor 416 may include at least a geospatial sensor. Sensor 416 may be located inside an aircraft; and/or be included in and/or attached to at least a portion of the aircraft. Sensor may include one or more proximity sensors, displacement sensors, vibration sensors, and the like thereof. Sensor may be used to monitor the status of aircraft for both critical and non-critical functions. Sensor may be incorporated into vehicle or aircraft or be remote.

Still referring to FIG. 4, in some embodiments, sensor 416 may be configured to sense a characteristic associated with any pilot control described in this disclosure. Non-limiting examples of a sensor 416 may include an inertial measurement unit (IMU), an accelerometer, a gyroscope, a proximity sensor, a pressure sensor, a light sensor, a pitot tube, an air speed sensor, a position sensor, a speed sensor, a switch, a thermometer, a strain gauge, an acoustic sensor, and an electrical sensor. In some cases, sensor 416 may sense a characteristic as an analog measurement, for instance, yielding a continuously variable electrical potential indicative of the sensed characteristic. In these cases, sensor 416 may additionally comprise an analog to digital converter (ADC) as well as any additionally circuitry, such as without limitation a Whetstone bridge, an amplifier, a filter, and the like.

For instance, in some cases, sensor 416 may comprise a strain gage configured to determine loading of one or flight components, for instance landing gear. Strain gage may be included within a circuit comprising a Whetstone bridge, an amplified, and a bandpass filter to provide an analog strain measurement signal having a high signal to noise ratio, which characterizes strain on a landing gear member. An ADC may then digitize analog signal produces a digital signal that can then be transmitted other systems within aircraft 400, for instance without limitation a computing system, a pilot display, and a memory component. Alternatively or additionally, sensor 416 may sense a characteristic of a pilot control 412 digitally. For instance in some embodiments, sensor 416 may sense a characteristic through a digital means or digitize a sensed signal natively. In some cases, for example, sensor 416 may include a rotational encoder and be configured to sense a rotational position of a pilot control; in this case, the rotational encoder digitally may sense rotational "clicks" by any known method, such as without limitation magnetically, optically, and the like.

Still referring to FIG. 4, electric aircraft may include flight controller 420 which may be the same as or similar to any flight controller as described herein. Electric aircraft 400 may include at least a motor 424, which may be mounted on a structural feature of the aircraft. Design of motor 424 may enable it to be installed external to structural member (such as a boom, nacelle, or fuselage) for easy maintenance access and to minimize accessibility requirements for the structure.; this may improve structural efficiency by requiring fewer large holes in the mounting area. In some embodiments, motor 424 may include two main holes in top and bottom of mounting area to access bearing cartridge. Further, a structural feature may include a component of electric aircraft 400. For example, and without limitation structural feature may be any portion of a vehicle incorporating motor 424, including any vehicle as described in this disclosure. As a further non-limiting example, a structural feature may include without limitation a wing, a spar, an outrigger, a fuselage, or any portion thereof persons skilled in the art, upon reviewing the entirety of this disclosure, will be aware of many possible features that may function as at least a structural feature. At least a structural feature may be constructed of any suitable material or combination of materials, including without limitation metal such as aluminum, titanium, steel, or the like, polymer materials or composites, fiberglass, carbon fiber, wood, or any other suitable material. As a non-limiting example, at least a structural feature may be constructed from additively manufactured polymer material with a carbon fiber exterior; aluminum parts or other elements may be enclosed for structural strength, or for purposes of supporting, for instance, vibration, torque or shear stresses imposed by at least a propulsor. Persons skilled in the art, upon reviewing the entirety of this disclosure, will be aware of various materials, combinations of materials, and/or constructions techniques.

Still referring to FIG. 4, electric aircraft 400 may include a vertical takeoff and landing aircraft (eVTOL). As used herein, a vertical take-off and landing (eVTOL) aircraft is one that can hover, take off, and land vertically. An eVTOL, as used herein, is an electrically powered aircraft typically using an energy source, of a plurality of energy sources to power the aircraft. In order to optimize the power and energy necessary to propel the aircraft. eVTOL may be capable of rotor-based cruising flight, rotor-based takeoff, rotor-based landing, fixed-wing cruising flight, airplane-style takeoff, airplane-style landing, and/or any combination thereof.

Rotor-based flight, as described herein, is where the aircraft generated lift and propulsion by way of one or more powered rotors coupled with an engine, such as a "quad copter," multi-rotor helicopter, or other vehicle that maintains its lift primarily using downward thrusting propulsors. Fixed-wing flight, as described herein, is where the aircraft is capable of flight using wings and/or foils that generate life caused by the aircraft's forward airspeed and the shape of the wings and/or foils, such as airplane-style flight.

With continued reference to FIG. 4, a number of aerodynamic forces may act upon the electric aircraft 400 during flight. Forces acting on electric aircraft 400 during flight may include, without limitation, thrust, the forward force produced by the rotating element of the electric aircraft 900 and acts parallel to the longitudinal axis. Another force acting upon electric aircraft 400 may be, without limitation, drag, which may be defined as a rearward retarding force which is caused by disruption of airflow by any protruding surface of the electric aircraft 400 such as, without limitation, the wing, rotor, and fuselage. Drag may oppose thrust and acts rearward parallel to the relative wind. A further force acting upon electric aircraft 400 may include, without limitation, weight, which may include a combined load of the electric aircraft 400 itself, crew, baggage, and/or fuel. Weight may pull electric aircraft 400 downward due to the force of gravity. An additional force acting on electric aircraft 400 may include, without limitation, lift, which may act to oppose the downward force of weight and may be produced by the dynamic effect of air acting on the airfoil and/or downward thrust from a propulsor of the electric aircraft. Lift generated by the airfoil may depend on speed of airflow, density of air, total area of an airfoil and/or segment thereof, and/or an angle of attack between air and the airfoil. For example, and without limitation, electric aircraft 400 are designed to be as lightweight as possible. Reducing the weight of the aircraft and designing to reduce the number of components is essential to optimize the weight. To save energy, it may be useful to reduce weight of components of electric aircraft 400, including without limitation propulsors and/or propulsion assemblies. In an embodiment, motor 424 may eliminate need for many external structural features that otherwise might be needed to join one component to another component. Motor 424 may also increase energy efficiency by enabling a lower physical propulsor profile, reducing drag and/or wind resistance. This may also increase durability by lessening the extent to which drag and/or wind resistance add to forces acting on electric aircraft 400 and/or propulsors.

With continued reference to FIG. 1, battery pack 100 may include a battery management system consistent with any battery management system as described in U.S. patent application Ser. No. 17/108,798, filed on Dec. 1, 2020, and titled, "SYSTEMS AND METHODS FOR BATTERY MANAGEMENT SYSTEM INTEGRATED IN A BATTERY PACK CONFIGURED FOR USE IN AN ELECTRIC AIRCRAFT."

Figure 5:
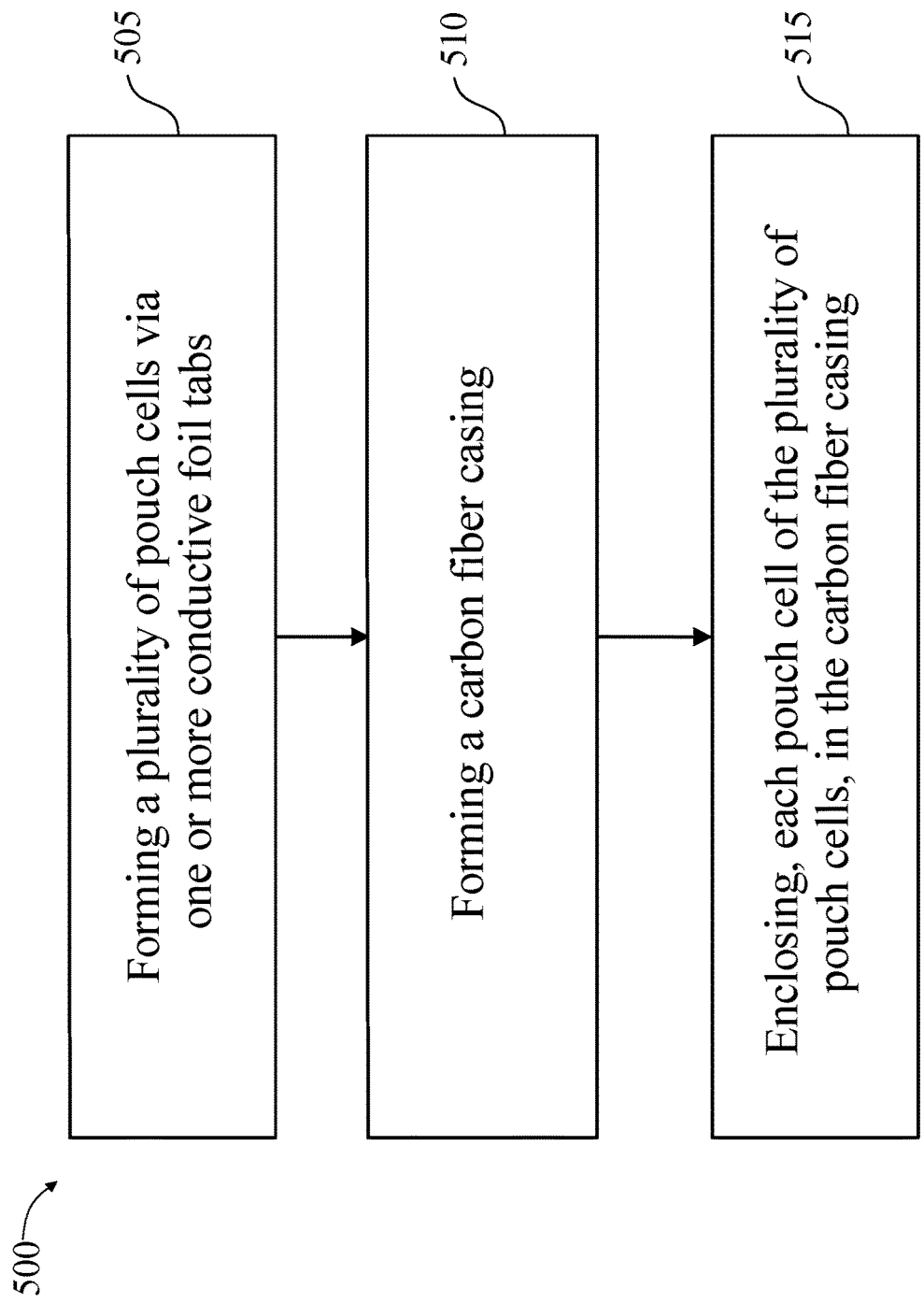
FIG. 5 is a flow diagram of an exemplary method of manufacture for a cell casing configured for use in an electric aircraft, in accordance with the present disclosure.

Referring now to FIG. 5, an exemplary method 500 of manufacturing a battery pack having a carbon fiber battery case. At step 505, method 500 may include forming a plurality of pouch cells with one or more conductive foil tabs.

Still referring to FIG. 5, at step 510, method 500 may include forming a casing. Casing 124 may be fabricated with carbon fiber. The structure of casing 124 is discussed above in detail with reference to FIGS. 2 and 3. However, curved corners and smooth internal surfaces of casing 124 allow for better circulation of heat and battery ejected while maintaining consistent pressure within the casing 124 to drive both the battery ejecta and heat out of the casing 124.

With continued reference to FIG. 5, at step 515, method 500 may include enclosing each pouch of the plurality of pouch cells in the casing. Casing 124 may include one or more separation sheets formed with carbon fiber. As mentioned above, casing 124 itself may be formed with carbon fiber. Carbon fiber in casing 124 may dissipate heat from the plurality of pouch cells. In one or more embodiments, casing may include one or more gaps formed by one or more spacings between one or more carbon fiber separation sheets. As discussed herein, heat dissipated from the plurality of pouch cells may be tunneled out of casing 124 via a conduit, opening, or the like. It should be noted that any steps of method 500 may be performed in any order and by any suitable manufacturer as described herein.

Figure 6:
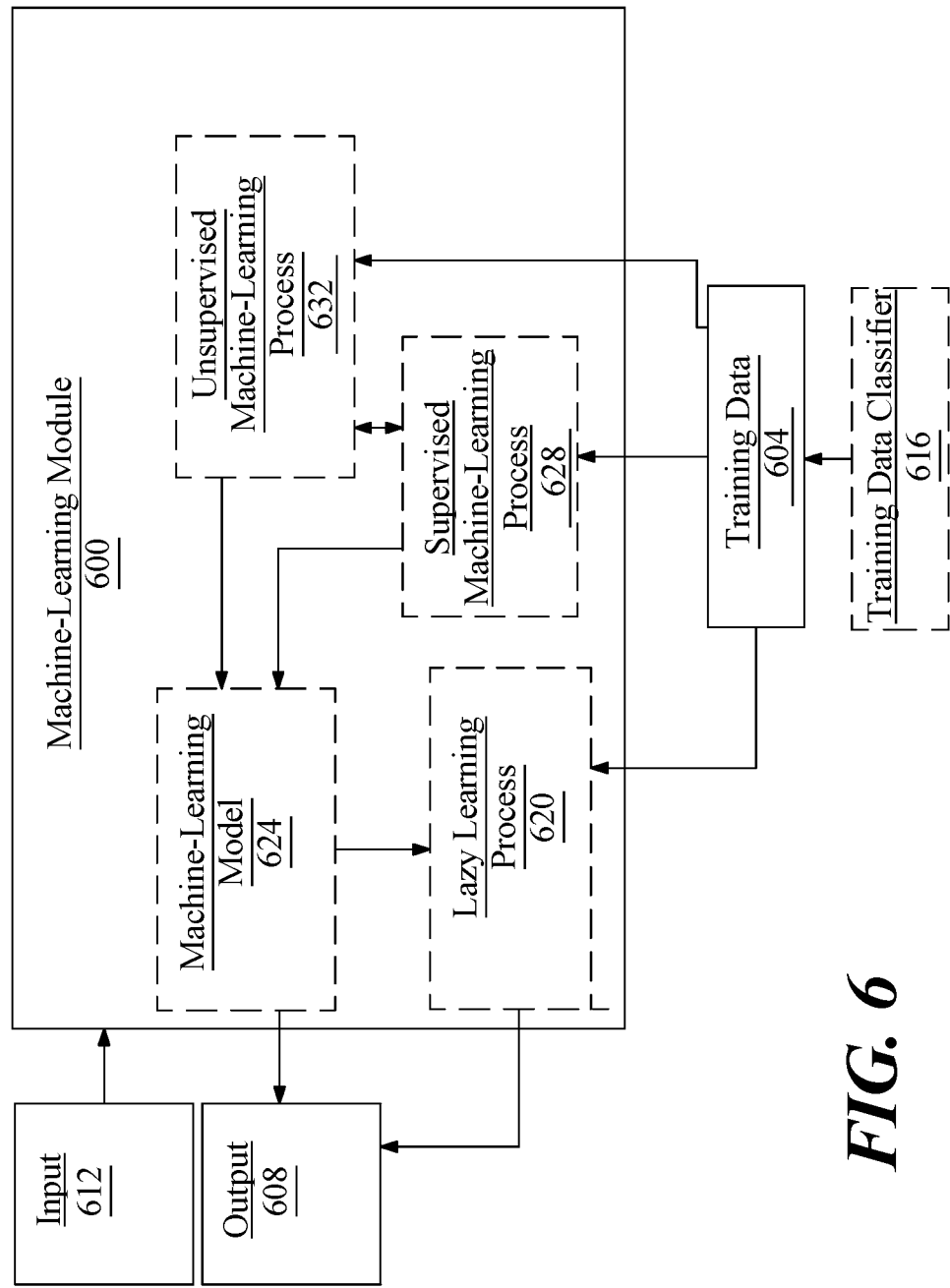
FIG. 6 is a block diagram of an exemplary embodiment of a machine-learning module, in accordance with the present disclosure.
Figure 7:
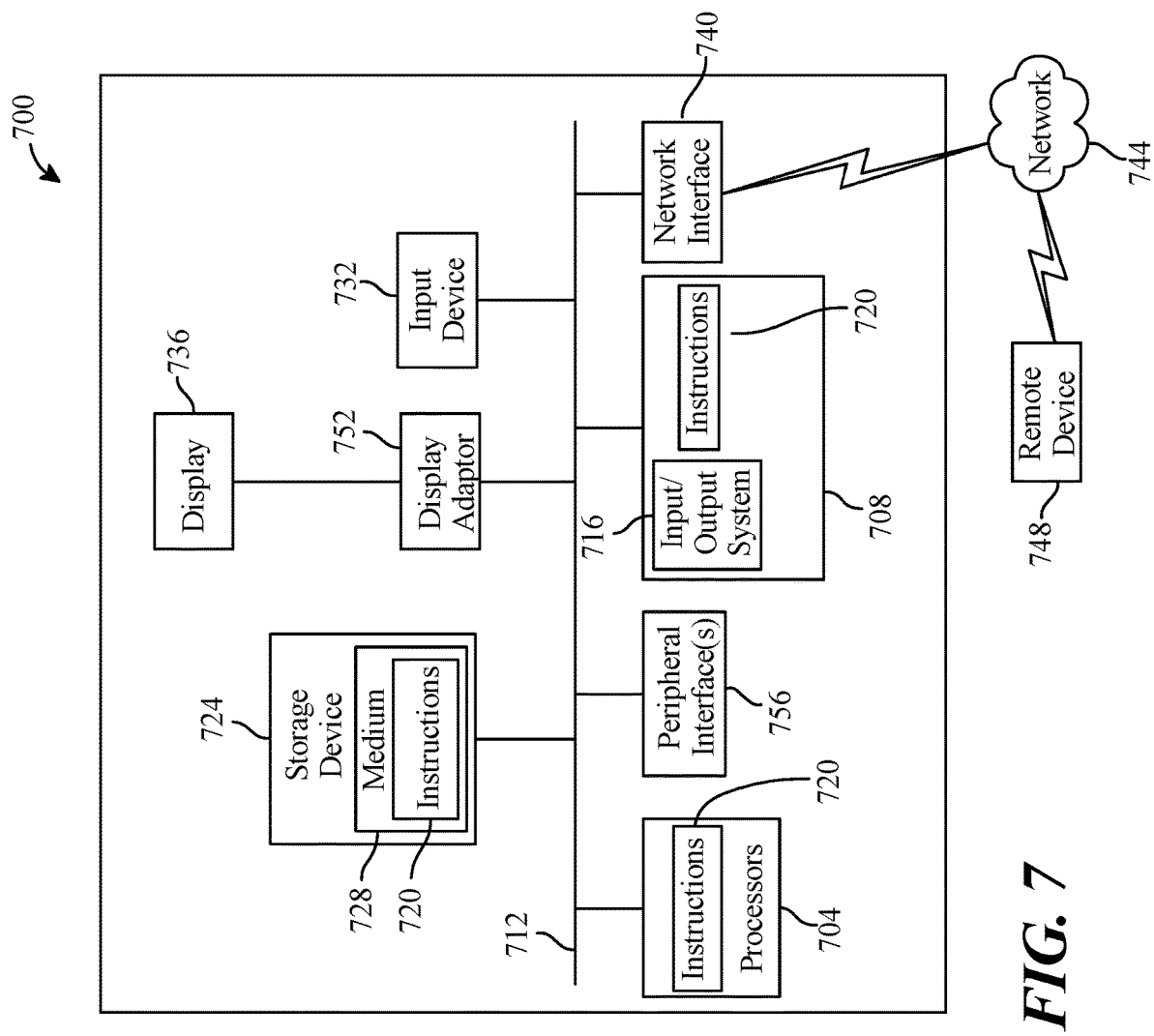
FIG. 7 is a block diagram of a computing system that can be used to implement any one or more of the methodologies disclosed herein and any one or more portions thereof.

Referring now to FIG. 6, an exemplary embodiment of a machine-learning module 600 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 604 to generate an algorithm that will be performed by a computing device/module to produce outputs 608 given data provided as inputs 612; this is in contrast to a non-machine learning software program where the commands to be executed are determined in advance by a user and written in a programming language.

Still referring to FIG. 6, "training data," as used herein, is data containing correlations that a machine-learning process may use to model relationships between two or more categories of data elements. For instance, and without limitation, training data 604 may include a plurality of data entries, each entry representing a set of data elements that were recorded, received, and/or generated together; data elements may be correlated by shared existence in a given data entry, by proximity in a given data entry, or the like. Multiple data entries in training data 604 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 604 according to various correlations; correlations may indicate causative and/or predictive links between categories of data elements, which may be modeled as relationships such as mathematical relationships by machine-learning processes as described in further detail below. Training data 604 may be formatted and/or organized by categories of data elements, for instance by associating data elements with one or more descriptors corresponding to categories of data elements. As a non-limiting example, training data 604 may include data entered in standardized forms by persons or processes, such that entry of a given data element in a given field in a form may be mapped to one or more descriptors of categories. Elements in training data 604 may be linked to descriptors of categories by tags, tokens, or other data elements; for instance, and without limitation, training data 604 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 6, training data 604 may include one or more elements that are not categorized; that is, training data 604 may not be formatted or contain descriptors for some elements of data. Machine-learning algorithms and/or other processes may sort training data 604 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable training data 604 to be made applicable for two or more distinct machine-learning algorithms as described in further detail below. Training data 604 used by machine-learning module 600 may correlate any input data as described in this disclosure to any output data as described in this disclosure. As a non-limiting illustrative example flight elements and/or pilot signals may be inputs, wherein an output may be an autonomous function.

Further referring to FIG. 6, training data may be filtered, sorted, and/or selected using one or more supervised and/or unsupervised machine-learning processes and/or models as described in further detail below; such models may include without limitation a training data classifier 616. Training data classifier 616 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 600 may generate a classifier using a classification algorithm, defined as a process whereby a computing device and/or any module and/or component operating thereon derives a classifier from training data 604. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier may classify elements of training data to sub-categories of flight elements such as torques, forces, thrusts, directions, and the like thereof.

Still referring to FIG. 6, machine-learning module 600 may be configured to perform a lazy-learning process 620 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 604. Heuristic may include selecting some number of highest-ranking associations and/or training data 604 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 6, machine-learning processes as described in this disclosure may be used to generate machine-learning models 624. A "machine-learning model," as used in this disclosure, is a mathematical and/or algorithmic representation of a relationship between inputs and outputs, as generated using any machine-learning process including without limitation any process as described above, and stored in memory; an input is submitted to a machine-learning model 624 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 624 may be generated by creating an artificial neural network, such as a convolutional neural network comprising an input layer of nodes, one or more intermediate layers, and an output layer of nodes. Connections between nodes may be created via the process of "training" the network, in which elements from a training data 604 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 6, machine-learning algorithms may include at least a supervised machine-learning process 628. At least a supervised machine-learning process 628, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include flight elements and/or pilot signals as described above as inputs, autonomous functions as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 604. Persons skilled in the art, upon reviewing the entirety of this disclosure, will be aware of various possible variations of at least a supervised machine-learning process 628 that may be used to determine relation between inputs and outputs. Supervised machine-learning processes may include classification algorithms as defined above.

Further referring to FIG. 6, machine learning processes may include at least an unsupervised machine-learning processes 632. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 6, machine-learning module 600 may be designed and configured to create a machine-learning model 624 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 6, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve embodiments according to this disclosure. Accordingly, this description is meant to be taken only by way of example, and not to otherwise limit the scope of this invention.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random-access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

FIG. 6 shows a diagrammatic representation of one embodiment of a computing device in the exemplary form of a computer system 700 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 700 includes a processor 704 and a memory 708 that communicate with each other, and with other components, via a bus 712. Bus 712 may include any of several types of bus structures including, but not limited to, a memory bus, a memory controller, a peripheral bus, a local bus, and any combinations thereof, using any of a variety of bus architectures.

Processor 704 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 704 may be organized according to Von Neumann and/or Harvard architecture as a non-limiting example. Processor 704 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating-point unit (FPU), and/or system on a chip (SoC).

Memory 708 may include various components (e.g., machine-readable media) including, but not limited to, a random-access memory component, a read only component, and any combinations thereof. In one example, a basic input/output system 716 (BIOS), including basic routines that help to transfer information between elements within computer system 700, such as during start-up, may be stored in memory 708. Memory 708 may also include (e.g., stored on one or more machine-readable media) instructions (e.g., software) 720 embodying any one or more of the aspects and/or methodologies of the present disclosure. In another example, memory 708 may further include any number of program modules including, but not limited to, an operating system, one or more application programs, other program modules, program data, and any combinations thereof.

Computer system 700 may also include a storage device 724. Examples of a storage device (e.g., storage device 724) include, but are not limited to, a hard disk drive, a magnetic disk drive, an optical disc drive in combination with an optical medium, a solid-state memory device, and any combinations thereof. Storage device 724 may be connected to bus 712 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 724 (or one or more components thereof) may be removably interfaced with computer system 700 (e.g., via an external port connector (not shown)). Particularly, storage device 724 and an associated machine-readable medium 728 may provide nonvolatile and/or volatile storage of machine-readable instructions, data structures, program modules, and/or other data for computer system 700. In one example, software 720 may reside, completely or partially, within machine-readable medium 728. In another example, software 720 may reside, completely or partially, within processor 704.

Computer system 700 may also include an input device 732. In one example, a user of computer system 700 may enter commands and/or other information into computer system 700 via input device 732. Examples of an input device 732 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 732 may be interfaced to bus 712 via any of a variety of interfaces (not shown) including, but not limited to, a serial interface, a parallel interface, a game port, a USB interface, a FIRE-WIRE interface, a direct interface to bus 712, and any combinations thereof. Input device 732 may include a touch screen interface that may be a part of or separate from display 736, discussed further below. Input device 732 may be utilized as a user selection device for selecting one or more graphical representations in a graphical interface as described above.

A user may also input commands and/or other information to computer system 700 via storage device 724 (e.g., a removable disk drive, a flash drive, etc.) and/or network interface device 740. A network interface device, such as network interface device 740, may be utilized for connecting computer system 700 to one or more of a variety of networks, such as network 744, and one or more remote devices 748 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 744, may employ a wired and/or a wireless mode of communication. In general, any network topology may be used. Information (e.g., data, software 720, etc.) may be communicated to and/or from computer system 700 via network interface device 740.

Computer system 700 may further include a video display adapter 752 for communicating a displayable image to a display device, such as display device 736. Examples of a display device include, but are not limited to, a liquid crystal display (LCD), a cathode ray tube (CRT), a plasma display, a light emitting diode (LED) display, and any combinations thereof. Display adapter 752 and display device 736 may be utilized in combination with processor 704 to provide graphical representations of aspects of the present disclosure. In addition to a display device, computer system 700 may include one or more other peripheral output devices including, but not limited to, an audio speaker, a printer, and any combinations thereof. Such peripheral output devices may be connected to bus 712 via a peripheral interface 756. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A battery comprising:
    a plurality of battery packs positioned in a stacked arrangement along a central axis,
    wherein the plurality of battery packs comprises:
        a plurality of carbon fiber casings positioned in the stacked arrangement; and
        a plurality of pouch cells disposed within the plurality of carbon fiber casings,
        wherein each pouch cell respectively comprises a pouch, and a single battery cell disposed within the pouch,
        wherein each carbon fiber casing respectively comprises a plurality of carbon fiber sheets formed to define an interior volume which is shaped and dimensioned to respectively receive one pouch cell of the plurality of pouch cells therein,
        wherein each carbon fiber casing is respectively configured with carbon fibers of at least one respective carbon fiber sheet extending along an axis perpendicular to the central axis to promote dissipation of heat from one pouch cell in a direction substantially perpendicular to the central axis and away from adjacent carbon fiber casings in the stacked arrangement,
    wherein each battery pack respectively comprises a single carbon fiber casing of the plurality of carbon fiber casings, and a single pouch cell of the plurality of pouch cells disposed within the single carbon fiber casing.

2. The battery of claim 1, wherein each pouch cell respectively comprises a pair of conductive tabs.

3. The battery of claim 1, wherein each carbon fiber casing respectively comprises a curved cross-section.

4. The battery of claim 1, wherein each carbon fiber casing respectively comprises an inner surface configured to abut an outer surface of, and absorb heat from, a corresponding one of the pouch cells disposed therein.

5. The battery of claim 4, wherein the inner surface of each carbon fiber casing respectively comprises a smooth surface of a carbon fiber sheet.

6. The battery of claim 1, further comprising a heat sink thermally coupled with the plurality of carbon fiber casings.

7. The battery of claim 6, wherein the heat sink comprises a fluid.

8. The battery of claim 1, wherein each carbon fiber casing is an ejecta barrier configured to direct ejecta from a corresponding one of the pouch cells disposed therein.

9. The battery of claim 1, wherein the plurality of carbon fiber sheets of each carbon fiber casing respectively comprises carbon fibers oriented in the direction substantially perpendicular to the central axis.

10. The battery of claim 9, wherein each carbon fiber in the plurality of carbon fibers sheets of each carbon fiber casing is respectively oriented in the direction substantially perpendicular to the central axis.

11. The battery of claim 1, wherein each pouch cell includes a plurality of electrodes.

* * * * *